Feb. 5, 1952     W. E. CUTHBERTSON     2,584,557
ADJUSTABLY SECURED TRAY FOR MOTOR VEHICLES
Filed Sept. 19, 1950
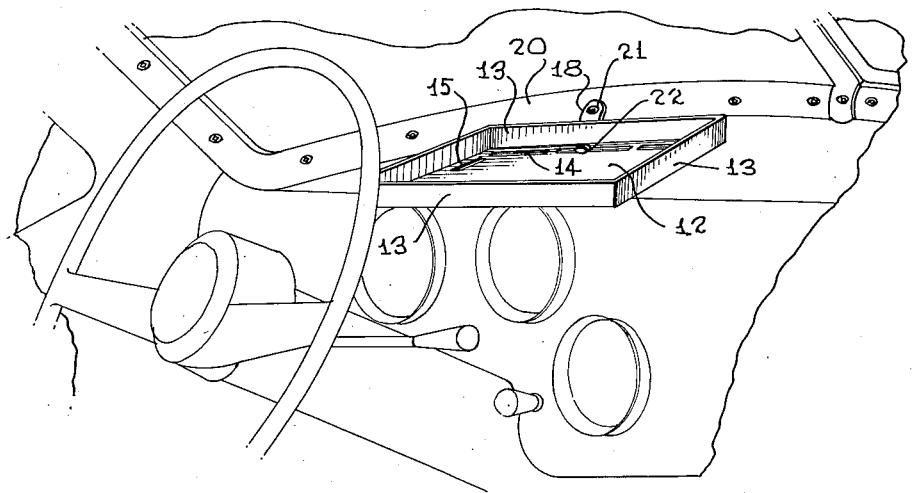
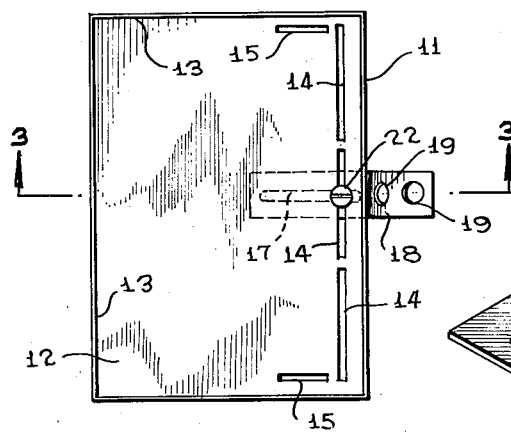
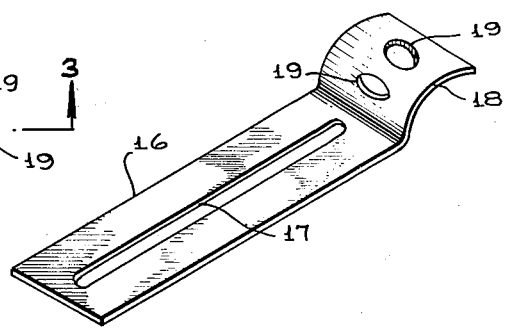
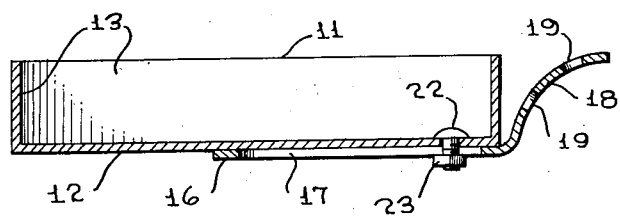
INVENTOR.
WILLIS E. CUTHBERTSON
BY
*McMorrow, Berman & Davidson*
ATTORNEYS Patented Feb. 5, 1952

2,584,557

UNITED STATES PATENT OFFICE 2,584,557

ADJUSTABLY SECURED TRAY FOR MOTOR VEHICLES

Willis E. Cuthbertson, Plymouth, Ind.

Application September 19, 1950, Serial No. 185,643

1 Claim. (Cl. 311—21)

This invention relates to trays, and more particularly to a serving tray adapted to be adjustably secured to the windshield molding of a motor vehicle.

A main object of the invention is to provide a novel and improved tray device which is simple in construction, which is easy to install, and which is readily adjustable in accordance with different models of automobiles.

A further object of the invention is to provide an improved adjustable tray device adapted to be secured to the windshield molding of a motor vehicle, said tray device being very inexpensive to manufacture, being sturdy in construction, being attractive in appearance, and being useful for supporting maps, pencils, cigarettes, spectacles, articles of food, or other objects.

Further objects and advantages of the invention will become apparent from the following description and claims, and from the accompanying drawings, wherein:

Figure 1 is a perspective view of the interior of a motor vehicle passenger compartment, showing an improved tray device according to the present invention secured to the windshield molding of the motor vehicle;

Figure 2 is a top plan view of the improved tray device of Figure 1;

Figure 3 is an enlarged, cross-sectional, detail view taken on line 3—3 of Figure 2;

Figure 4 is an enlarged, perspective view of the mounting bracket employed to support the tray element in the device illustrated in Figures 1 and 2.

Referring to the drawings, 11 designates a tray which may be of any suitable shape, for example, rectangular in shape as shown, the tray being provided with the major supporting surface 12 and the marginal, upstanding walls 13. The major surface 12 is formed with a plurality of elongated slots 14 located adjacent one of the side marginal walls 13 and with additional slots 15, 15 adjacent the respective end marginal walls 13. Designated at 16 is a supporting bracket comprising an elongated, flat bar formed with a longitudinal slot 17. At one end the bar is formed with an arcuate extension 18 which is shaped to fit over the molding customarily employed around an automobile windshield on the interior of the automobile. The extension 18 is formed with a plurality of apertures 19 adapted to receive one of the windshield fastening screws.

In using the device, the bracket 16 is secured to the molding of an automobile windshield, shown for example at 20 in Figure 1, one of the molding fastening screws 21 being employed to secure the bracket. This is accomplished by first removing the fastening screw, placing the arcuate portion 18 of the bracket over the molding with one of the openings 19 aligned with the opening in the molding from which the screw has been removed, and then replacing the fastening screw through said opening 19 and through the aperture in the molding intended for the fastening screw. With the bracket member 16 thus secured to the windshield molding, the tray 11 is secured on said bracket member by means of a bolt 22 extending through a selected slot 14 or 15 and through the slot 17 in the bracket, the bolt 22 being provided with a suitable securing nut 23, as shown in Figure 3. It will be readily apparent that the tray 11 may be adjusted in any desired angular position around the bolt 22 and may be adjusted along the slot 17 or along any one of the slots 14 or 15 employed for securing the tray member. It will be further apparent that the bracket device 16 may be secured to any other suitable portion of the automobile interior, such as a window frame molding or the like.

It will be seen from the above description that the tray device may be installed rapidly inside an automobile passenger compartment, and when installed, as shown in Figure 1, the tray member will be supported above the vehicle instrument board or in convenient reach of the operator of the automobile. The bracket 16 is preferably made of malleable metal stock, so that it may be easily bent to adjust the tray member to a horizontal position.

While a specific embodiment of an improved automobile tray device has been disclosed in the foregoing description, it will be understood that various modifications within the spirit of the invention may occur to those skilled in the art. Therefore, it is intended that no limitations be placed on the invention except as defined by the scope of the appended claim.

What is claimed is:

A tray device of the character described comprising an elongated bracket member of flat bar stock, an apertured arcuate extension at one end of said bracket member, said extension forming an obtuse angle with said bracket member and adapted to fit over the windshield molding of a motor vehicle, said extension being formed with a plurality of holes, whereby said bracket member may be secured to said molding by one of the fastening elements of said molding, the bracket member being formed with a longitudinal slot, a tray member supported on the slotted portion of said bracket member, said tray member being provided with upstanding marginal walls and the bottom of said tray member being formed with a plurality of elongated slots adjacent and parallel to said marginal walls, and a bolt extending through a selected one of said slots in the bottom of said tray member and the slot in the bracket member, whereby said tray member may be adjustably secured to said bracket member in any of a plurality of adjusted positions.

WILLIS E. CUTHBERTSON.

REFERENCES CITED

The following references are of record in the file of this patent:

UNITED STATES PATENTS

| Number | Name | Date |
|---|---|---|
| 797,451 | McBryde | Aug. 15, 1905 |
| 1,723,238 | Hoot | Aug. 6, 1929 |
| 1,946,967 | Douglas | Feb. 13, 1934 |
| 2,067,661 | Ferrell | Jan. 12, 1937 |
| 2,080,261 | Funk | May 11, 1937 |
| 2,112,669 | Halas | Mar. 29, 1938 |
| 2,125,476 | Westrope et al. | Aug. 2, 1938 |
| 2,244,861 | Walker | June 10, 1941 |
| 2,494,980 | Zuckerman | Jan. 17, 1950 |
| 2,536,084 | Peters et al. | Jan. 2, 1951 |
| 2,549,753 | Ashman | Apr. 24, 1951 |

FOREIGN PATENTS

| Number | Country | Date |
|---|---|---|
| 354,071 | Great Britain | Aug. 6, 1931 |